Patented Oct. 19, 1954

2,692,247

UNITED STATES PATENT OFFICE 2,692,247

ALPHA AMINOCARBOXYLIC ACID POLYMER COMPOSITIONS

Boynton Graham, Claymont, Del., assignor to E. I. du Pont de Nemours and Company, Wilmington, Del., a corporation of Delaware No Drawing. Application July 13, 1950, Serial No. 173,690

7 Claims. (Cl. 260—42)

This invention relates to polyamides and more specifically to blends of different types of synthetic alpha-amino acid polyamides.

Synthetic homopolyamides and copolyamides of alpha-primary amino acids are generally resistant to acid, direct, and vat type dyes and are only moderately dyed by acetate type dyes. One solution of this problem, that disclosed in the copending application of MacDonald and Schreiber, Serial No. 110,024, filed August 12, 1949, now Patent No. 2,671,772, of alpha-amino acid copolyamides containing appreciable proportions of N-substituted constituents which exhibit generally good dye receptivity has a disadvantage from the commercial standpoint in that it is necessary that a very careful balance be maintained in the relative proportions of the alpha-secondary and alpha-primary amino acid units to insure both good dyeability and good film and fiber properties. In another solution of the problem, that disclosed in the copending application of MacDonald, Serial No. 78,223, filed February 24, 1949, now Patent No. 2,592,446, the dye receptivity of the alpha-primary amino acid polyamides is improved by aftertreating them with amide-forming derivatives of selected alpha-secondary amino acids. In still another solution of the problem, that disclosed in the copending application of Graham, Serial No. 110,229, filed August 13, 1949, now Patent No. 2,636,873, blends of the alpha-primary amino acid polyamides and polymeric polyamines provide compositions of improved dyeability, while still maintaining many of the desirable properties of the alpha-primary amino acid polyamides.

However, each of the above solutions of the problem is but partially satisfactory since in each some of the otherwise desirable properties of alpha-amino acid polymers are lost or at least reduced in extent.

This invention has as an object the provision of new blends of synthetic alpha-amino acid polyamides. A further object is the provision of such blends having good dye receptivity toward acetate, acid, direct, and vat dyestuffs.

These objects are accomplished by the present invention of new and useful blends of synthetic alpha - monoaminomonocarboxylic acid polyamides which blends consist essentially of synthetic linear alpha-monoaminomonocarboxylic acid polyamides wherein the recurring chain unit is —N—C—CO—, from 5 to 95% of which synthetic linear alpha-monoaminomonocarboxylic acid polyamides exhibit, in oriented form, a characteristic X-ray repeat distance along the fiber axis of 5.10 to 5.40±0.05 Å. and 95 to 5% of which synthetic alpha-aminocarboxylic acid linear polyamides exhibit, in oriented form, a characteristic X-ray repeat distance along the fiber axis of 6.60 to 7.00±0.05 Å. and, in unoriented form, a prominent, characteristic X-ray spacing of 4.60 to 4.90±0.05 Å. The polyamides of the second type when oriented, do not exhibit a characteristic X-ray repeat distance along the fiber axis of 5.10 to 5.40±0.05 Å. For convenience, alpha-amino acid polyamides of the first type are designated herein as type I polyamides, and those of the second type as type II polyamides. The type I polyamides are usually soluble in nonpolar solvents such as benzene and are frequently insoluble in polar solvents such as m-cresol or formic acid. Solvent-cast films of the type I polyamides are usually oriented in a plane parallel to the casting surface and exhibit an X-ray chain spacing of 5.10 to 5.40±0.05 Å.

The type II polyamides are usually soluble, if at all, only in polar solvents, except in those particular instances where the nature of the side chain in the alpha-amino acid units making up the preponderance of the polyamide is such as to be dominant, e. g., long hydrocarbon side chains confer hydrocarbon solubility as do solubilizing groups, such as ester groups. By "side chain," is meant the radicals attached directly to the glycine skeleton,

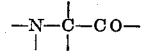

in the amino acid units making up the polyamide. Solvent-cast films of the type II polyamides are unoriented and do not exhibit an X-ray spacing in the 5.10 to 5.40±0.05 Å. range.

The preferred blends of this invention, due to the readier availability of the starting amino acids, comprise at least one synthetic alpha-amino acid polyamide of type I, either a homo- or copolyamide, which contains a preponderance of units of alpha-amino acids which have a gamma carbon atom (i. e., in relation to the carboxyl carbon) carrying, in addition to the beta carbon, at least two other carbons, or a heteroatom (O, N, or S), or a functional group, and at least one alpha-amino acid polyamide of type II, either a homo- or a copolyamide, which contains a preponderance of units in which the gamma carbon atom is absent (i. e., the amino acid is of shorter chain length, or instead of a gamma carbon there is a heteroatom), or, if present, it is at most a secondary carbon, being attached to the beta carbon, to hydrogen, and, at most, one other carbon. The particularly preferred blends of this invention, not only by reason of the greater availability of the starting amino acids, but also because of the readier preparability of high molecular weight polyamides from such acids, comprise at least one alpha-amino acid polyamide of each of the types I and II, both of which polyamides contain a preponderance of units of alpha-amino acids as described, respectively, just above—the acids being hydrocarbon except for the one amino and one carboxyl groups.

Because of their relatively greater ease of preparation, those blends comprising solely alpha-amino acid homopolyamides of the two previously characterized types, i. e., I and II, are preferred. Because of the greater effects engendered therein, blends comprising from 25 to 75% type I alpha-amino acid polyamides and 75 to 25% type II alpha-amino acid polyamides are preferred. For use in the preparation of fibers, blends comprising from 40 to 60% type I alpha-amino acid polyamides and from 60 to 40% type II alpha-amino acid polyamides are preferred because such compositions exhibit a better balance of water sensitivity (sufficient to enable processing by normally used aqueous treatments), organic solvent solubility, and strength and toughness in fiber form.

It is rather surprising that the large number of alpha-amino acid polyamides known can be clearly and distinctly classified into these two types, i. e., types I and II. This is particularly surprising since the alpha-amino acid polyamides in general vary widely in many properties such as organic solvent solubility, water sensitivity and the like—while being relatively or preponderantly the same in basic structure. For instance, the polyamide from beta-methyl aspartate,

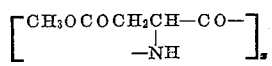

and the polyamide from its methylene chain homolog, gamma-methyl glutamate,

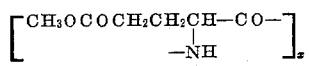

both clearly are classifiable as type I polyamides; whereas, the polyamide from O-acetylserine,

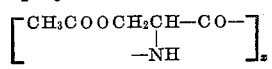

a simple isomer of beta-methyl aspartate, is classifiable with equal clarity as a type II polyamide. Furthermore, for instance, the homopolyamides from leucine (type I polymers) are easily soluble in benzene, chloroform and m-cresol; whereas, the homopolymers from the isomeric DL-norleucine, as well as those from the lower methylene chain homolog DL-valine and also its isomer, DL-norvaline, all type II polymers, are completely insoluble in any one of these three solvents. It is surprising that these clearly distinguishable classes of alpha-amino acid polyamides can, in fact, be blended to give homogeneous compositions, and still more surprising, that these blended compositions exhibit such vastly improved properties over those of either component alone.

The blends of this invention can be conveniently prepared by dissolving the different type polyamides in a mutual solvent and then evaporating the mutual solvent or forming the solution directly into the desired article, e. g., a film or filament. The most suitable common solvents will vary from blend to blend as the ingredients of the blends themselves vary. For instance, blends containing a preponderance of polyamides containing relatively large proportions of leucine units will be most readily dissolved in hydrocarbon or halogenated hydrocarbon solvents, although phenolic type solvents such as m-cresol may also be used. On the other hand, blends containing a relatively high proportion of polyamides containing a preponderance of short chain alpha-amino acid units will be most readily dissolved in the phenolic type solvents or in the stronger acid solvents such as dichloroacetic acid.

Other methods known in the art for preparing blends or mixtures of organic polymers can also be used. For instance, the blends of this invention can be prepared by simple mechanical mixing, which is best accomplished with efficient stirring, grinding, or milling, of the various components involved, or by solution blending wherein each of the components of the blend are dissolved separately in a suitable solvent and the resulting solutions mixed or by melt blending of the various polyamides involved—again best accomplished with efficient stirring.

The following examples, in which the parts given are by weight, are presented to further illustrate this invention. As used therein, inherent viscosity ($\eta_{inh.}$) is defined by the following equation:

$$\eta_{inh.} = \frac{ln\eta_{rel}}{C}$$

wherein $ln$ represents the natural logarithm and $$\eta_{rel} = \frac{\eta_{solution}}{\eta_{solvent}}$$

$\eta$ being viscosity and $C$ the concentration of the solute in grams per 100 cc. of solution. Unless otherwise noted all inherent viscosity results are obtained with the polyamide involved dissolved in m-cresol at a concentration of 0.5 gram of polymer per 100 cc. of solution at 25° C. Intrinsic viscosity [$\eta$] as used in these examples is defined by the following equation:

$$[\eta] = \lim_{C \to 0} \frac{ln\eta_{rel}}{C}$$

wherein $ln$, $C$ and $\eta_{rel}$ are as defined above. In all instances, the specific solvent used at 25° C. for any one intrinsic viscosity figure will be given.

*Example I*

An alpha-amino acid copolyamide[1] is prepared from a 1:1 by weight mixture of the N-carboanhydrides of sarcosine and 2-amino-4,6,6-trimethylheptanoic acid [1] dissolved in xylene at 3% solids concentration by heating at 65° C. for 28 hours under capillary reflux. The polymer after isolation is water insoluble and exhibits an $\eta_{inh.}$ of 0.14.

This type I copolyamide exhibits good general dye receptivity for selected acetate, acid, direct, and vat type dyestuffs.

Another alpha-amino acid copolyamide [2] is prepared from a 1:1 by weight mixture of the N-carboanhydrides of norleucine[2] and alpha-aminoisobutyric acid by heating a 2.4% benzene solution of the mixture at 65° C. for seven days. The copolyamide after isolation is found to exhibit an $\eta_{inh.}$

---

[1] The preparation of this acid, its N-carboanhydride, and the copolymer itself, are discussed in greater detail in the copending application of MacDonald, Serial No. 778,459, filed October 7, 1947, now Patent No. 2,572,842.
[2] The preparation of this N-carboanhydride, as well as the copolymer, is discussed in greater detail in the copending application of Tullock, Serial No. 99,853, filed June 17, 1949, now Patent No. 2,608,548.

of 0.705 and to be capable of forming clear, tough films exhibiting a tenacity of 3710 lb./sq. in. and a 8.8% elongation. This type II copolyamide is completely resistant to selected acid, direct and vat type dyes and only moderately dyed by acetate type dyes.

A mixture of 7 parts of the above-described 2-amino-4,6,6-trimethylheptanoic acid/sarcosine copolyamide and 21 parts of the above-described norleucine/alpha-aminoisobutyric acid copolyamide is dissolved in a mixture of 1200 parts of chloroform and 10 parts of m-cresol by tumbling overnight at room temperature. The resulting solution is strained through cheesecloth, flowed in a thick film onto a glass plate, and the solvent mixture allowed to evaporate at room temperature. After removal from the casting surface, there is obtained a smooth film of the 1:3 blend of the copolyamides. This film is tough and cold draws quite readily.

This blend of copolyamides in film form exhibits generally good dye receptivity for acetate, acid, direct, and vat type dyestuffs especially when the dyeing is carried out utilizing dyebaths containing an added small percentage of a swelling agent for the copolyamides involved, such as, for instance, m-cresol. Thus, as can be seen, this blend of the two types of alpha-amino copolyamides combines the good general dye receptivity of the one with the toughness and generally good film and fiber forming properties of the other with no apparent increase in any of the less desirable properties of either of the copolyamides. Such a result in the blending art is particularly outstanding and unexpected since, in general, polymer blends tend to emphasize in the resultant blends the unsatisfactory properties of the components. In many instances, in fact, the resultant blends exhibit these unsatisfactory properties to a greater extent than is true of either of the original components.

*Example II*

A mixture of 7 parts of the high molecular weight polyamide from DL-alanine [3] ($[\eta]=0.65$ in formic acid), a type II polymer, and 7 parts of the high molecular weight polyamide from DL-leucine[3] ($[\eta]=1.40$ in m-cresol), a type I polymer, is dissolved in a mixture of 107.5 parts of m-cresol and 132.5 parts of chloroform by stirring under nitrogen at 50° C. for three hours and then for 18 hours at room temperature. The clear, somewhat viscous solution thus obtained is pressure filtered and then pressure spun at the rate of 2.7 to 2.8 ml. of spinning solution per minute through a 30 hole (0.005 inch hole diameter) stainless steel spinneret into an acetone coagulating bath at 25° C. The yarn travel in the coagulating bath is 35 inches and the windup of the yarn on a Godet wheel is at the rate of 33 feet per minute. The yarn is then stretched 260%, i. e., drawn to a ratio of 2.6:1 of its original length in air at room temperature, immediately after coming off the Godet wheel. The yarn is then immersed in acetone for 15 hours to remove residual m-cresol, then dried, sized, and twisted two turns per inch. The resulting yarn from the 50/50 blend of the high molecular weight polymers from DL-alanine and DL-leucine has a denier of 62 and exhibits a tenacity of 1.04 grams per denier, an elongation of 38%, a modulus of elasticity of 32 grams per denier, and when subjected to relaxed boil off, shrinks only 3-6%, does not become brittle, and remains resilient.

In contrast, yarn similarly prepared from the high molecular weight polyamide from DL-alanine, although exhibiting a tenacity of 1.5 grams per denier, exhibits an elongation of only 9%, a modulus of elasticity of only 14 grams/denier/100% and a 42% shrinkage during relaxed boil off. In further contrast, yarn similarly prepared from the high molecular weight polyamide from DL-leucine exhibits a tenacity of only 0.8 gram per denier, an elongation of only 7% and a modulus of elasticity of only 27 grams/denier/100% and a 5% shrinkage during relaxed boil off.

Thus, the blend of the copolyamides in yarn form surprisingly exhibits a far greater percentage of elongation, as well as a higher modulus of elasticity, than those exhibited by either of the components of the blends alone. Furthermore, the high shrinkage ratio exhibited by the polyamide from DL-alanine is surprisingly nowhere evident in the blend of this invention while at the same time its good, general dyeability is retained to the fullest extent in the fibers from the blend, which also are well and deeply dyed by acetate, acid, direct, and vat type dyestuffs. In contrast to this behavior, yarn prepared similarly from the high molecular weight polyamide from DL-leucine exhibits very poor dye receptivity for most types of dyes under these conditions. The yarn from the above blend of this invention is insoluble in chlorinated solvents such as chloroform, tetrachloroethane, trichloroethylene in which the yarn from the high molecular weight polyamide from DL-leucine dissolves readily. The blend of this invention thus combines the good resilience and water receptivity of the polyamide from DL-leucine with the good tenacity and dye receptivity of the polyamide from DL-alanine, exhibits a higher modulus than does either component alone, and at the same time exhibits none of the undesirable properties of either component alone.

A film prepared from the above-described 1:1 blend of the polyamides from DL-leucine and from DL-alanine is swollen with methanol and while in the swollen state drawn 2.5:1. Upon immersion in boiling water, this film shrinks only 2.3%, i. e., to a residual draw ratio of 2.2:1 and remains tough and flexible. In contrast, a film prepared similarly from the polyamide from DL-leucine is cold drawn 1.85:1. After immersion in boiling water for 30 minutes, this film shrinks 19%, 1.5:1. Similarly, a film prepared from the polyamide of DL-alanine is swollen with methanol and while in the swollen condition is drawn 3.0:1. Upon immersion in boiling water for 30 minutes this film shrinks 67%, i. e., to its original length and becomes very brittle. Thus, the resistance to shrinkage of drawn films of this blend is unexpectedly highly superior to that of either component alone.

*Example III*

A mixture of 95 parts of the high molecular weight polyamide from DL-leucine [4] ($[\eta]=1.5$ in m-cresol), a type I polymer, and 5 parts of the high molecular polyamide from DL-alanine[4] ($[\eta]=0.30$ in formic acid), a type II polymer, is dissolved in a mixture of 1,037 parts of m-cresol and 600 parts of chloroform by stirring at room

---

[3] The preparation of the high molecular weight polymer from DL-alanine is described in greater detail in the copending application of Miegel, Serial No. 197,513, filed November 24, 1950. Similarly, the preparation of the high molecular weight polymer from DL-leucine is described in greater detail in the copending application of Cleaver and Schreiber, Serial No. 71,756, filed January 19, 1949, and now abandoned.

[4] See previous footnote in Example II.

temperature. The resultant viscous solution is pressure filtered and flowed in a thin film onto a glass plate. The solvent mixture is allowed to evaporate at room temperature and after standing at room temperature for three days, the film is removed from the casting surface and baked at 65° C. for 8 hours. There is thus obtained a clear, smooth, tough, strong film of a 95/5 blend of the high molecular weight polyamides from DL-leucine and DL-alanine which is well dyed with such representative acetate dyes as the blue dyestuff obtainable by the procedure of the examples in U. S. 2,050,704 and the red dyestuff described in the sole sample of Swiss Patent 149,405. This dye receptivity is considerably superior to that exhibited by the unmodified polyamide from DL-leucine.

*Example IV*

A mixture of 5 parts of the polyamide from DL-leucine [4] ($[\eta]=1.4$ in m-cresol), a type I polymer, and 95 parts of the polyamide from DL-alanine[4] ($[\eta]=0.65$ in formic acid), a type II polymer, is dissolved in a mixture of 930 parts of m-cresol and 1500 parts of chloroform by stirring at room temperature. The resulting viscous solution, after being pressure filtered, is flowed in a thin film onto a glass plate and the solvent mixture allowed to evaporate at room temperature. After standing for three days at room temperature the film is removed from the casting surface and baked at 65° C. for eight hours. There is thus obtained a clear, smooth, hard film of the 5/95 blend of the high molecular weight polyamides from DL-leucine and DL-alanine. The film is soaked in methanol and cold drawn to a draw ratio of 2.6:1. A strip of this drawn film is immersed in boiling water for 30 minutes during which time it shrinks 43%, i. e., to a final draw ratio of 1.9:1, but remains tough. In contrast, a film of the unmodified high molecular weight polyamide from DL-alanine, upon being soaked in methanol and drawn, when immersed in boiling water shrinks back to its original undrawn dimensions and becomes very brittle.

*Example V*

A mixture of 50 parts of the polyamide from alpha-amino-n-butyric acid[5], a type II polymer and 50 parts of the polyamide from beta-methyl aspartate, a type I polymer, is dissolved in 1115 parts of 98-100% formic acid at room temperature. The resulting viscous solution is filtered, flowed in a thin film onto a glass plate, and the solvent mixture allowed to evaporate at room temperature. After removal from the casting surface, there is obtained a clear, brittle smooth film of the 50/50 blend of the polyamides from alpha-amino-n-butyric acid and beta-methyl aspartate which is insoluble in hot water. In contrast, the unmodified polyamide from beta-methyl aspartate is soft and elastic and readily dissolves in boiling water. The polymer blend exhibits generally good receptivity for acetate, acid, direct and vat type dyestuffs. This blend thus combines the good dye receptivity of the polyamide from beta-methyl aspartate with the desirable brittleness and water insensitivity of the polyamide from alpha-amino-n-butyric acid and is particularly useful as a substrate for the preparation of organic pigments.

*Example VI*

A mixture of equal parts of the high molecular weight polyamides from DL-methionine[6] ($[\eta]=0.74$ in m-cresol) a type I polymer, and from epsilon-acetoxy - DL - alpha-amino-n-caproic acid[7] ($[\eta]=0.26$ in m-cresol), a type II polymer, is dissolved in chloroform. The resulting viscous solution is flowed in a thin film onto a glass plate and the solvent allowed to evaporate at room temperature. Upon removal from the casting surface, there is obtained a smooth, rubbery, tough, readily cold-drawable film of the 50/50 blend of the preformed high molecular weight polyamides from DL-methionine, and epsilon-acetoxy-DL-methionine, and epsilon-acetoxy - DL - alpha-amino-n-caproic acid. Samples of this blend in film form exhibit particularly good receptivity for the acetate type dyes as illustrated specifically by those mentioned previously in Example III. In this respect the blend of the polymers is markedly and surprisingly superior to the receptivity exhibited by either of its components alone.

Films of this blend after being drawn to twice their original length, i. e., to a draw ratio of 2.0:1, when immersed in cold water shrink until a residual draw ratio of 1.65 is present in the films. On the other hand, the polyamide from DL-methionine alone shrinks to a residual draw ratio of 1.45:1 and that from epsilon-acetoxy-DL-alpha-amino-n-caproic acid alone to a residual draw ratio of 1.64:1. The blend is largely insoluble in formic acid which is an excellent solvent for the polyamide from epsilon-acetoxy-DL-alpha-amino-n-caproic acid alone. On the other hand the blend is completely soluble in tetrachloroethane which is a non-solvent for the same polyamide alone.

Film properties of the polyamides from DL-methionine alone and epsilon-acetoxy-DL-alpha-amino-n-caproic acid alone, as well as those from the above-described 50/50 blend of these polyamides, are summarized in the following table:

| Film of— | Draw Ratio of Film | Tensile Strength, Lb./Sq. In. | Elongation, Percent | Modulus of Stiffness, Lb./Sq. In. |
|---|---|---|---|---|
| Polymer from DL-methionine | No draw | 9,684 | 8 | 513,158 |
| Polymer from epsilon-acetoxy-DL-norleucine. | do | 701 | 88 | 16,125 |
| The above-described 50/50 blend | do | 1,535 | 137 | 46,498 |
| Polymer from DL-methionine | 2.25:1 | 18,098 | 12 | 47,619 |
| Polymer from epsilon-acetoxy-DL-norleucine. | 2.0:1 | 514 | 123 | 8,050 |
| The above-described 50/50 blend | 2.5:1 | 4,988 | 43 | 125,519 |

---

[4] See previous footnote in Example II.

[5] The preparation of the N-carboanhydride and low polymers therefrom is given by Curtius and Sieber, Ber. 55, 1543 (1922).

[6] The preparation of this polyamide is disclosed in the copending application of MacDonald, Serial No. 766,457, filed August 5, 1947, now Patent No. 2,572,844.

[7] The preparation of this high molecular weight polyamide is described in the copending application of MacDonald and Tullock, Serial No. 137,285, filed January 6, 1950, now Patent No. 2,630,423.

It is thus apparent that in the undrawn condition this blend of these types I and II polymers possesses appreciably better elongation than that afforded by either component alone, and that after drawing, the blend exhibits much higher stiffness than that exhibited by either drawn component alone.

*Example VII*

A mixture of 5 parts of the polyamide from DL-alpha-aminolauric acid, a type II polymer, and 5 parts of the high molecular weight copolyamide from a 2:1 by weight mixture of the N-carboanhydrides of 2-amino-4,6,6-trimethylheptanoic acid and alanine, [8] a type I copolymer, is dissolved in a mixture of 270 parts of chloroform and 36 parts of benzene. The clear, viscous solution resulting is flowed in a thin film onto a glass plate and the solvent mixture allowed to evaporate at room temperature. Upon removal from the casting surface, there is obtained a smooth, pliable, tough, readily cold-drawable film of the 50/50 blend of the high molecular weight polyamide from DL-alpha-aminolauric acid and the above-described 2-amino-4,6,6-trimethylheptanoic acid/alanine copolyamide.

When immersed in benzene (which is a good solvent for the polyamide from alpha-aminolauric acid alone) film samples of this blend swell and become soft, but do not dissolve and upon drying remain smooth, pliable, tough and readily cold-drawable. A film of this blend after being cold-drawn to a draw ratio of 2.0:1 and then immersed in hot water shrinks to a residual draw ratio of 1.79:1. On the other hand, a film sample of the 2-amino-4,6,6-trimethyheptanoic acid/alanine copolyamide alone when treated similarly, shrinks to a residual draw ratio of 1.47; whereas, the film sample of the polyamide from alpha-aminolauric acid, treated in a similar fashion, shrinks to a residual draw ratio of 1.84:1. Further film properties of this blend vs. its separate components are summarized in the following table:

6.60 to 7.00 Å. in oriented form and a prominent, characteristic X-ray spacing of about 4.60 to 4.90 Å. in unoriented form. The invention thus includes blends having as type I polyamide components) i. e., those exhibiting, in oriented form, an X-ray chain identity period of about 5.10 to 5.40 Å.) the homopolyamides from leucine, 2-amino - 4,6,6 - trimethylheptanoic acid, methionine, beta-methyl aspartate, gamma-methyl glutamate, gamma-methoxynorvaline, and the copolyamides from the following by weight mixtures of N-carboanhydrides: 1/1, 1-aminocyclohexanecarboxylic acid/alpha - aminoisobutyric acid; 1/1, phenylalanine/alpha-aminoisobutyric acid; 1/1, phenylalanine leucine; 1/1, 1-aminocyclohexanecarboxylic acid leucine; 1/1, 2-amino - 4,6,6 - trimethylheptanoic acid leucine; 2/1, 2-amino-4,6,6-trimethylheptanoic acid/alanine; 1/1, phenylalanine/gamma - methyl glutamate; 1/1, 2 - amino-4,6,6 - trimethylheptanoic acid/sarcosine. The invention further includes blends having as type II polyamide components (i. e., those exhibiting an X-ray chain identity period of about 6.60 to 7.00 Å. in oriented form and a characteristic X-ray spacing of about 4.60 to 4.90 in unoriented form) the homopolyamides from alanine, alpha-amino-n-butyric acid, norvaline, valine, norleucine, isoleucine, alpha-aminocaprylic acid, alpha-aminolauric acid, alpha-aminocyclohexylacetic acid, epsilon-acetoxy-alpha-amino-n-caproic acid, the partially hydrolyzed polyamide therefrom, i. e., a polymer containing epsilon - acetoxy - alpha - amino - n-caproic acid and epsilon hydroxy-alpha-amino-n-capric acid units, O-acetylserine, N-phenylglycine, sarcosine and copolyamides having similar X-ray spacings, such as the copolyamide from a 1:1 by weight mixture of the N-carboanhydrides of norleucine and alpha-aminoisobutyric acid.

The invention includes blends from optically active (D— or L—) polyamides as well as from optically inactive (DL—) polyamides.

| Film of— | Draw Ratio of Film | Tensile Strength, Lb./Sq. in. | Elongation, Percent | Modulus of Stiffness, Lb./Sq. In. |
|---|---|---|---|---|
| The polyamide from DL-alpha-aminolauric acid. | No draw | 669 | 171 | 4,733 |
| The above-described 2-amino-4,6,6-trimethylheptanoic acid/alanine copolyamide. | do | 4,531 | 88 | 120,631 |
| The above-described blend | do | 2,444 | 98 | 74,609 |
| The above-described polyamide from DL-alpha-aminolauric acid. | About 2.0:1 | 1,910 | 51 | 30,881 |
| The above-described 2-amino-4,6,6-trimethyl heptanoic acid/alanine copolyamide. | do | 6,226 | 20 | 161,290 |
| The above-described blend | do | 4,173 | 24 | 121,638 |

Thus, as may be seen, this blend combines the good tenacity and stiffness of the 2-amino-4,6,6-trimethylheptanoic acid/alanine copolyamide with the higher elongation and resistance to shrinkage of the polyamide from alpha-aminolauric acid.

The present invention is generic to blends of synthetic linear alpha-monoaminomonocarboxylic acid polyamides, 5 to 95% of said polyamides exhibiting, in oriented form, an X-ray chain identity period of about 5.10 to 5.40 Å., and the remainder of said polyamides in the blends exhibiting an X-ray chain identity period of about The blends of this invention may contain, in addition to the predominant alpha-amino acid polyamides of types I and II, other materials, such as waxes, oils, resins, dyes, plasticizers, tackifiers, stabilizers, curing agents, pigments, fillers, and other modifiers. They may also contain minor amounts of organic polymers, such as polyvinyl acetate, cellulose acetate, cellulose propionate, cellulose nitrate, vinyl and vinylidene resins, especially the halogen-containing vinyl resins such as vinyl chloride/vinyl acetate and vinyl chloride/acrylonitrile copolymers, polyvinyl chloride, polyvinylidene chloride and the like; diene type polymers such as the polymers from 2 - chlorobutadiene - 1,3, 2,3 - dichlorobutadiene-1,3; fluorine containing polymers, e. g., polyvinyl ---
[8] The preparation of this high molecular weight copolymer is described in the copending application of MacDonald, Serial No. 778,459, filed October 7, 1947.

fluoride and poly-2-fluorobutadiene-1,3; styrene/ butadiene mixtures; after-treated diene polymers, such as halogenated polymers from 2-chlorobutadiene-1,3 and the like; condensation type polymers such as the polyesters, the polyester amides, the polyanhydrides; other polyamides such as those of the nylon type, all as broadly described in U. S. Patents 2,072,250–253.

The blends of this invention can be used in preparing films and fibers of outstanding utility in the film, fabric, and fabric replacement field. These films and fibers exhibit to a high degree the combination of desirable properties long sought for in the alpha-amino acid field. As is illustrated by the examples, they exhibit good dye receptivity. They are also resistant to dry-cleaning solvents, and at the same time, are resilient and resistant to shrinkage in boiling water while yet exhibiting sufficient water sensitivity to make them processible by the normally used aqueous processing treatments of the fiber art. The most outstanding of these blends—due to the combination of these properties in greater degree—are the blends of alanine and leucine.

The term "blend" is used herein in its primary sense (Webster-Merriam, New International Dictionary, second edition, 1944) to designate a mixture such that the separate things mixed, i. e., the line of demarcation, cannot be distinguished.

The term "amino acid" used herein is used to designate a monoaminomonocarboxylic acid.

The term "X-ray chain identity period" denotes, according to Bunn, Chemical Crystallography, Oxford, 1945, page 188, the identity period, i. e., unit cell dimension along the fibre axis. This factor is also termed "repeat along the fiber axis" (Bamford et al., Nature 164, 138), or "meridional spacing" (Astbury et al., Nature 162, 597; Brown et al. 163, 834) or "repeat distance along the fiber axis" (Bawn, The Chemistry of High Polymers, Interscience, 1948, page 191).

The term "heteroatom" refers to oxygen, nitrogen, and sulfur. For complete clarity these may be defined as heteroatoms (Classification Bulletin 200, page 4) of atomic number not more than 16.

As indicated above the term "about" used in connection with the Angstrom units in the X-ray spacings and X-ray chain identity period means within 0.05 Å. above or below the indicated value.

The term "cold drawable" used in the specification refers to that phenomenon exhibited by the polyamides used in this invention, which is described generally in the art on high molecular weight polymers, for example, on page 182, vol. I, of High Polymers, Interscience Publishers, Inc., 1940, and in lines 15 through 63, page 7, column 1, of U. S. Patent 2,071,250, i. e., the special property exhibited by certain polymers in film or fiber form, when mechanical stress is gently applied at room or slightly elevated temperatures, of not breaking apart, but separating into two non-oriented sections joined by a thinner section of more highly oriented polymer. As the mechanical stress, i. e., pulling is continued, this more highly oriented section grows at the expense of the unoriented sections until the latter are completely exhausted. A remarkable feature of this phenomenon is the sharpness of the boundary at the junction between the highly oriented and less oriented sections of the film or fiber being drawn. During the drawing operation, the shape of this boundary does not change. It merely advances linearly through the undrawn sections of the polymer until the latter are exhausted. This operation can be carried out very rapidly and smoothly. It leads to permanently elongated, highly and permanently oriented films and fibers of greatly improved strength, toughness, and elasticity, which exhibit a high degree of birefringence and a parallel extinction between crossed Nicol prisms and display a typically oriented film and fiber diagram when examined by X-ray methods in the usual way.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A composition of good dye receptivity and resistance to shrinkage in water and of adequate sensitivity to aqueous processing treatments predominantly comprising a homogeneous blend of high molecular weight, synthetic linear alpha-aminocarboxylic acid polyamides from 5 to 95% of which, in said composition, and separately, when in oriented fiber form, exhibit a characteristic X-ray repeat distance, along the fiber axis, of about 5.10 to 5.40 Å., the remainder of the alpha-aminocarboxylic acid polyamides differing therefrom in amino acid composition and exhibiting in said composition, and separately, when in oriented fiber form, a characteristic X-ray repeat distance, along the fiber axis, of about 6.60 to 7.00 Å. and, in said composition, and separately, when in unoriented form, a characteristic prominent X-ray spacing of about 4.60 to 4.90 Å., neither component separately exhibiting the X-ray characteristics recited for the other component.

2. A composition of good dye receptivity and resistance to shrinkage in water and of adequate sensitivity to aqueous processing treatments predominantly comprising a homogeneous blend of high molecular weight, synthetic linear alpha-aminocarboxylic acid polyamides in which polyamides the units apart from the N—C—CO group are hydrogen and carbon and from 5 to 95% of which, in said composition, and separately, when in oriented fiber form, exhibit a characteristic X-ray repeat distance, along the fiber axis, of about 5.10 to 5.40 Å., the remainder of the alpha-aminocarboxylic acid polyamides differing therefrom in amino acid composition and exhibiting in said composition, and separately, when in oriented fiber form, a characteristic X-ray repeat distance, along the fiber axis, of about 6.60 to 7.00 Å. and, in said composition, and separately, when in unoriented form, a characteristic prominent X-ray spacing of about 4.60 to 4.90 Å., neither component separately exhibiting the X-ray characteristics recited for the other component.

3. A composition of good dye receptivity and resistance to shrinkage in water and of adequate sensitivity to aqueous processing treatments essentially consisting of a homogeneous blend of high molecular weight, synthetic linear alpha-aminocarboxylic acid polyamides from 25 to 75% of which, in said composition, and separately, when in oriented fiber form, exhibit a characteristic X-ray repeat distance, along the fiber axis, of about 5.10 to 5.40 Å., the remainder of the alpha-aminocarboxylic acid polyamides differing therefrom in amino acid composition and exhibiting in said composition, and separately, when in oriented fiber form, a characteristic X-ray repeat distance, along the fiber axis, of about 6.60 to 7.00 Å. and, in said composition, and separately, when in unoriented form, a characteristic prominent X-ray spacing of about 4.60 to 4.90 Å., neither component separately exhibiting the X-ray characteristics recited for the other component.

4. A composition of good dye receptivity and resistance to shrinkage in water and of adequate sensitivity to aqueous processing treatments essentially consisting of a homogeneous blend of high molecular weight, synthetic linear alpha-aminocarboxylic acid polyamides from 40 to 60% of which, in said composition, and separately, when in oriented fiber form, exhibit a characteristic X-ray repeat distance, along the fiber axis, of about 5.10 to 5.40 Å., the remainder of the alpha-aminocarboxylic acid polyamides differing therefrom in amino acid composition and exhibiting in said composition, and separately, when in oriented fiber form, a characteristic X-ray repeat distance, along the fiber axis, of about 6.60 to 7.00 Å. and, in said composition, and separately, when in unoriented form, a characteristic prominent X-ray spacing of about 4.60 to 4.90 Å., neither component separately exhibiting the X-ray characteristics recited for the other component.

5. A composition of good dye receptivity and resistance to shrinkage in water and of adequate sensitivity to aqueous processing treatments essentially consisting of a homogeneous blend of high molecular weight, synthetic linear alpha-aminocarboxylic acid homopolyamides from 5 to 95% of which, in said composition, and separately, when in oriented fiber form, exhibit a characteristic X-ray repeat distance, along the fiber axis, of about 5.10 to 5.40 Å., the remainder of the alpha-aminocarboxylic acid homopolyamides differing therefrom in amino acid composition and exhibiting in said composition, and separately, when in oriented fiber form, a characteristic X-ray repeat distance, along the fiber axis, of about 6.60 to 7.00 Å. and, in said composition, and separately, when in unoriented form, a characteristic prominent X-ray spacing of about 4.60 to 4.90 Å., neither component separately exhibiting the X-ray characteristics recited for the other component.

6. A composition of good dye receptivity and resistance to shrinkage in water and of adequate sensitivity to aqueous processing treatments essentially consisting of a homogeneous blend of high molecular weight, synthetic linear alpha-aminocarboxylic acid homopolyamides from 5 to 95% of which is polyalanine exhibiting separately and in the composition when in oriented fiber form an X-ray repeat distance along the fiber axis of about 6.60 to 7.00 Å. and when in unoriented form a characteristic prominent X-ray spacing of about 4.60 to 4.90 Å., the remainder of the alpha-aminocarboxylic acid polyamides being polyleucine exhibiting separately and in the composition, when in oriented fiber form, an X-ray repeat distance along the fiber axis of about 5.10 to 5.40 Å., neither component separately exhibiting the X-ray characteristics recited for the other component.

7. A composition of good dye receptivity and resistance to shrinkage in water and of adequate sensitivity to aqueous processing treatments predominantly comprising a homogeneous blend of high molecular weight, synthetic linear alpha-aminocarboxylic acid polyamides from 5 to 95% of which, in said composition, and separately, when in oriented fiber form, exhibit a characteristic X-ray repeat distance, along the fiber axis, of 5.05 to 5.45 Å., the remainder of the alpha-aminocarboxylic acid polyamides differing therefrom in amino acid composition and exhibiting in said composition, and separately, when in oriented fiber form, a characteristic X-ray repeat distance, along the fiber axis, of 6.55 to 7.05 Å and, in said composition, and separately, when in unoriented form, a characteristic prominent X-ray spacing of 4.55 to 4.95 Å., neither component separately exhibiting the X-ray characteristics recited for the other component.

References Cited in the file of this patent

UNITED STATES PATENTS

| Number | Name | Date |
|---|---|---|
| 2,193,529 | Coffman et al. | Mar. 12, 1940 |
| 2,327,162 | Baldwin et al. | Aug. 17, 1943 |
| 2,339,237 | Brubaker et al. | Jan. 18, 1944 |

OTHER REFERENCES

Astbury et al.: Nature, October 16, 1948, vol. 162, pp. 596 to 598.

Meyer: Natural and Synthetic High Polymers, Interscience, 1942, pp. 448 to 451 and 474 to 475.

Mauersberger, Matthew's Textile Fibers, Wiley, 1947, p. 700.

Meyer: Natural and Synthetic High Polymers, 2nd edition, 1950, pages 76, 77, 524, 548 and 550.

Perutz: Nature, June 30, 1951, vol. 167, pp. 1053 and 1054.

Brown et al.: Nature, vol. 163, May 28, 1949, pp. 834 and 835.

Berl: Physical Methods in Chemical Analysis, vol. I, 1950, Academic Press, pp. 124 and 125.

Bunn: Chemical Crystallography, Oxford, 1945, pp. 188 and 189.

Meyer: Natural and Synthetic High Polymers, 2nd edition, 1950, pp. 551 to 554.

Mauersberger, Matthew's Textile Fibers, 5th edition, Wiley, 1947, pp. 528 to 530, 700 and 710.

Bamford et al.: Nature, vol. 164, July 23, 1949, pp. 138 and 139.

Bamford et al.: Nature, vol. 164, October 29, 1949, pp. 751 and 752.

Meyer: Natural and Synthetic High Polymers, Interscience, 1942, pp. 444, 445, 471 and 472.

Bamford: Hanby and Happey, Proc. Roy. Soc. London, 205A, 39 (1951); 206A, 408–17 (1951); Nature 166, 829–30 (1950).

Ambrose et al.: Proc. Roy. Soc., London, 205A, 48 (1951).

Robinson et al.: Nature 168, 325–326 (1951).

Elliott: Nature 170, 1066–1067 (1952).

Elliott et al.: Nature 165, 921–922 (1950).

Ambrose, Bamford, et al.: Nature 167, 264–5 (1951).

Astbury: Nature 164, 439–40 (19549).

Darmon et al.: Nature 164, 440–41 (1949).